United States Patent [19]

Matsumoto

[11] Patent Number: 4,666,306
[45] Date of Patent: May 19, 1987

[54] METHOD AND APPARATUS FOR DETECTING PHOTOGRAPHIC IMAGE INFORMATION

[75] Inventor: Fumio Matsumoto, Tokyo, Japan

[73] Assignee: Fuji Photo Film Co., Ltd., Minami-Ashigara, Japan

[21] Appl. No.: 691,309

[22] Filed: Jan. 14, 1985

[30] Foreign Application Priority Data

| Jan. 19, 1984 | [JP] | Japan | 59-7534 |
| Jan. 19, 1984 | [JP] | Japan | 59-7533 |
| Feb. 24, 1984 | [JP] | Japan | 59-33723 |
| Apr. 17, 1984 | [JP] | Japan | 59-77303 |
| Sep. 21, 1984 | [JP] | Japan | 59-198800 |

[51] Int. Cl.$^4$ ............................................. G01J 3/40
[52] U.S. Cl. ................................... 356/404; 356/380; 356/444; 355/38
[58] Field of Search ................ 355/35, 38, 68, 14 E; 356/379, 380, 404, 443, 444

[56] References Cited

U.S. PATENT DOCUMENTS

| 3,515,487 | 6/1970 | Hatcher, Jr. et al. | 356/379 |
| 3,709,613 | 1/1973 | Zahn et al. | 355/68 |
| 4,101,216 | 7/1978 | Grossmann | 356/404 |
| 4,105,925 | 8/1978 | Rossol et al. | 356/379 |
| 4,217,648 | 8/1980 | Thurm et al. | 356/404 |
| 4,286,868 | 9/1981 | Laska | 355/68 |
| 4,551,023 | 11/1985 | Nakauchi | 356/404 |

FOREIGN PATENT DOCUMENTS 0024508 3/1981 Japan ........................... 356/379

Primary Examiner—F. L. Evans
Attorney, Agent, or Firm—Wenderoth, Lind & Ponack

[57] ABSTRACT

The density of an original picture film must be measured in order to determine exposure and correction amount for printing in a photographic printing system. A photosensor was heretofore arranged near an optical path of the photographic printing system and used to measure the average density of a negative film in LATD. When an original film is printed on a photographic paper, it is necessary to adjust the exposure or correction amount for various sizes of the film due to the difference in diffusion by film size. Conventionally those adjustments are performed by visually judging the size of a film and inputting the information manually via a keyboard or reading a negative size status signal of a negative carrier. According to this invention, the image information of an original film can be detected precisely in detail by a simple structure to automatically discriminate the size of the film as well as to automatically and effectively determine the exposure amount for each size based upon the result of the automatic discrimination or the size data which is inputted separately.

25 Claims, 24 Drawing Figures

FIG. 3
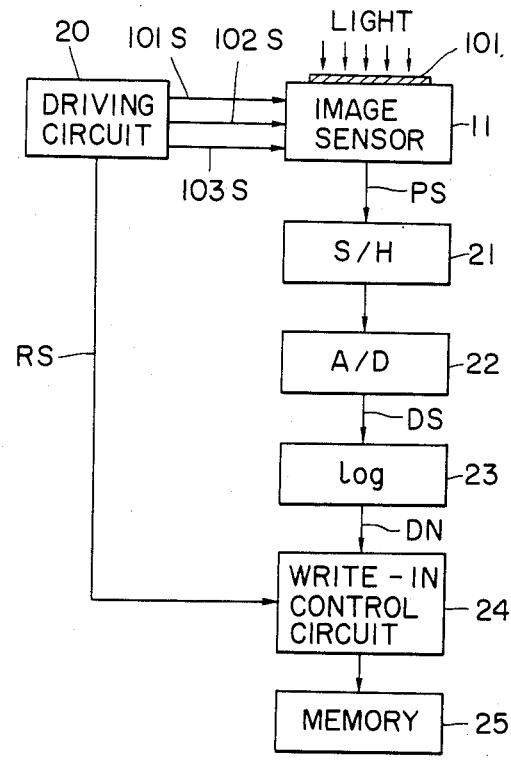
FIG. 4A
FIG. 4B
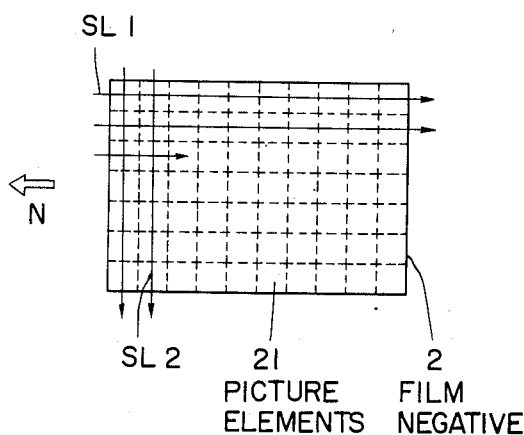

UPPER GUIDE 1B
APERTURE 1A
FILM NEGATIVE 2
1 FILM NEGATIVE CARRIER
1C LOWER GUIDE

| | | | | | |MA| |MAC,VAC| |VA| | | | | | | | |
|---|---|---|---|---|---|---|---|---|---|---|---|---|---|---|---|---|---|---|
|150|148|149|150|151|152|155|156|150|149|147|145|148|151|153|151|150|149|151|151|
|148|147|148|71|75|80|82|85|90|87|85|80|79|77|78|78|80|150|151|151|
|145|146|145|73|45|47|50|52|53|53|52|51|50|48|47|46|82|151|152|152|
|147|148|147|80|46|28|27|25|24|26|28|30|32|33|36|50|84|150|151|153|
|151|150|149|82|48|30|0|0|0|0|0|0|0|0|35|53|84|149|152|150|
|153|152|152|80|50|33|0|0|0|0|0|0|0|0|30|50|85|148|150|150|
|149|145|153|83|52|35|0|0|0|0|0|0|0|0|28|51|80|147|150|150|
|147|144|150|81|53|34|0|0|0|0|0|0|0|0|26|53|79|149|151|150|
|146|147|149|78|50|30|28|30|33|36|40|38|34|32|30|52|78|150|151|150|
|150|146|151|77|51|48|47|46|49|50|52|49|48|47|48|50|80|152|149|149|
|152|143|150|80|82|85|90|92|91|88|85|84|83|82|84|83|82|153|150|148|
|150|142|147|149|152|153|151|152|149|147|146|145|151|152|154|153|152|154|151|149|

| | |MA| | | | | |MAC,VAC| | | | | |VA| | | | | |
|---|---|---|---|---|---|---|---|---|---|---|---|---|---|---|---|---|---|---|---|
|52|35|37|40|38|41|43|41|37|36|38|40|42|45|46|50|51|48|40|51|
|54|38|0|0|0|0|0|0|0|0|0|0|0|0|0|0|0|0|36|52|
|50|33|0|0|0|0|0|0|0|0|0|0|0|0|0|0|0|0|38|55|
|53|30|0|0|0|0|0|0|0|0|0|0|0|0|0|0|0|0|40|60|
|55|32|0|0|0|0|0|0|0|0|0|0|0|0|0|0|0|0|42|61|
|57|34|0|0|0|0|0|0|0|0|0|0|0|0|0|0|0|0|45|65|
|61|38|0|0|0|0|0|0|0|0|0|0|0|0|0|0|0|0|47|63|
|63|40|0|0|0|0|0|0|0|0|0|0|0|0|0|0|0|0|45|61|
|65|42|0|0|0|0|0|0|0|0|0|0|0|0|0|0|0|0|44|58|
|60|39|0|0|0|0|0|0|0|0|0|0|0|0|0|0|0|0|43|56|
|58|38|0|0|0|0|0|0|0|0|0|0|0|0|0|0|0|0|42|54|
|54|36|35|33|36|37|34|33|30|38|37|36|35|38|40|42|43|40|41|53|

| 52 | 35 | 37 | 40 | 38 | 41 | 43 | 41 | 37 | 36 | 38 | 40 | 42 | 45 | 46 | 50 | 51 | 48 | 40 | 51 |
|---|---|---|---|---|---|---|---|---|---|---|---|---|---|---|---|---|---|---|---|
| 54 | 38 | 36 | 14 | 0 | 0 | 0 | 0 | 0 | 0 | 0 | 0 | 0 | 0 | 0 | 0 | 12 | 37 | 36 | 52 |
| 50 | 33 | 33 | 8 | 0 | 0 | 0 | 0 | 0 | 0 | 0 | 0 | 0 | 0 | 0 | 0 | 9 | 35 | 38 | 55 |
| 53 | 30 | 32 | 7 | 0 | 0 | 0 | 0 | 0 | 0 | 0 | 0 | 0 | 0 | 0 | 0 | 6 | 33 | 40 | 60 |
| 55 | 32 | 31 | 1 | 0 | 0 | 0 | 0 | 0 | 0 | 0 | 0 | 0 | 0 | 0 | 0 | 2 | 32 | 42 | 61 |
| 57 | 34 | 22 | 0 | 0 | 0 | 0 | 0 | 0 | 0 | 0 | 0 | 0 | 0 | 0 | 0 | 0 | 23 | 45 | 65 |
| 61 | 38 | 15 | 0 | 0 | 0 | 0 | 0 | 0 | 0 | 0 | 0 | 0 | 0 | 0 | 0 | 0 | 14 | 47 | 63 |
| 63 | 40 | 10 | 0 | 0 | 0 | 0 | 0 | 0 | 0 | 0 | 0 | 0 | 0 | 0 | 0 | 0 | 11 | 45 | 61 |
| 65 | 42 | 7 | 0 | 0 | 0 | 0 | 0 | 0 | 0 | 0 | 0 | 0 | 0 | 0 | 0 | 0 | 6 | 44 | 58 |
| 60 | 39 | 5 | 0 | 0 | 0 | 0 | 0 | 0 | 0 | 0 | 0 | 0 | 0 | 0 | 0 | 0 | 4 | 43 | 56 |
| 58 | 38 | 2 | 0 | 0 | 0 | 0 | 0 | 0 | 0 | 0 | 0 | 0 | 0 | 0 | 0 | 0 | 2 | 42 | 54 |
| 54 | 36 | 35 | 33 | 36 | 37 | 34 | 33 | 30 | 38 | 37 | 36 | 35 | 38 | 40 | 42 | 43 | 40 | 41 | 53 |

METHOD AND APPARATUS FOR DETECTING PHOTOGRAPHIC IMAGE INFORMATION

BACKGROUND OF THE INVENTON

This invention relates to a method for detecting photographic image information which can automatically and accurately detect the photographic image information and the size of an original film such as a film negative over the whole area which has been segmented into picture elements, and which can automatically determine the exposure and/or correction amount for photographic printing, and to an apparatus therefor.

In a photographic printer, it is necessary to measure the density of an original film (that is, a film negative or positive) in order to determine exposure or correction amount required for printing the film. In the prior art, the average density of a film negative is photographically measured with respect to its LATD (Large Area Transmittance Density) by a photo-sensor such as a photodiode provided near the light path of an optical system. This image detection of the LATD uniformly determines photometric values of the film negatives, but does not precisely measure the density of images over all of the frame. This leads to such drawbacks as incorrect exposure or uncertain correction.

When an original picture film is exposed on a photographic paper, the exposure and correction amounts should be adjusted depending on the size of the particular film because of the difference in diffusion. In the prior art, the size of the original picture film is judged visually and the size factor is manually inputted via a keyboard or a film negative size status signal is read out from a negative film carrier. But such measures entail complex manipulation of the keyboard or signal processing which sometimes causes errors in input operation.

If the photometric area is to be changed for every film size and the formula of determining exposure is to be selected each time, there are involved further complicated photographic printing processes.

SUMMARY OF THE INVENTION

This invention is contrived in view of the above mentioned situation and aims at providing a method for precisely detecting the details of image information of an original film as well for automatically discriminating the size of the film by simple structure.

Another object of this invention is to provide a method for detecting photographic image information which can automatically and effectively determine the exposure amount corresponding to the particular size in accordance with the result of automatic discrimination or a size information which is separately inputted.

A still further object of this invention is to provide a method for detecting photographic image information which can automatically set the position of an image information area and which can detect the information of the area without mechanical adjustment of the position of an image sensor.

Still another object of this invention is to provide a detecting apparatus which can detect image information accurately without causing a detected image to be distorted even if the apparatus is positioned at an inclination against the optical axis.

According to this invention, in one aspect thereof, for achieving objects described above, there is provided a method for discriminating the size of an original picture film which is characterized in that the light transmitted or reflected from the original film is received by an image sensor, the image information over the whole area from which said image sensor received light is detected from respective segmented elements and said detected values are compared with the predetermined values in order to discriminate the size of said original picture film.

According to this invention, in another aspect thereof, for achieving objects described above, there is provided a photographic image information detecting method which is characterized in that the light transmitted or reflected from an original picture film is received by an image sensor, the image information of the whole frame area from which said image sensor receives light is detected from respective segmented elements, the size of said original picture film is discriminated, the image information for each element is sorted out in accordance with the exposure determination area which is preset for each size with the size discrimination information, and the result is added to an exposure determination formula to determine the final exposure for said original picture film.

According to this invention, in still another aspect thereof, for achieving objects described above, there is provided a photographic image information detecting method which is characterized in that the light transmitted or reflected from an original picture film is received by an image sensor, the image information of the whole light received by said image sensor is detected from respective segmented elements of a frame, a characteristic element is selected out of said elements and used as the reference position, and an image information area is automatically set by the size discrimination data of said original film.

Further, according to this invention, in another aspect thereof, for achieving objects described above, there is provided an image information detecting apparatus of the type wherein the light transmitted or reflected from an original picture film is received by an image sensor, the image information of the whole area from which said image sensor receives light is detected from respective segmented elements, the apparatus being characterized in that when said image sensor is arranged at a position out of the optical axis of said original film, the distortion of a detected image caused by the photometry from a position oblique from said film is compensated and corrected by arranging the light receiving surface of said image sensor in parallel to said original film.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a block diagram of the control system of the two-dimensional image sensor according to this invention;

FIGS. 4A and 4B are charts used to explain the relationship between the picture element segmentation of an original film and the stored data;

DETAILED DESCRIPTION OF THE INVENTION

Figure 1:
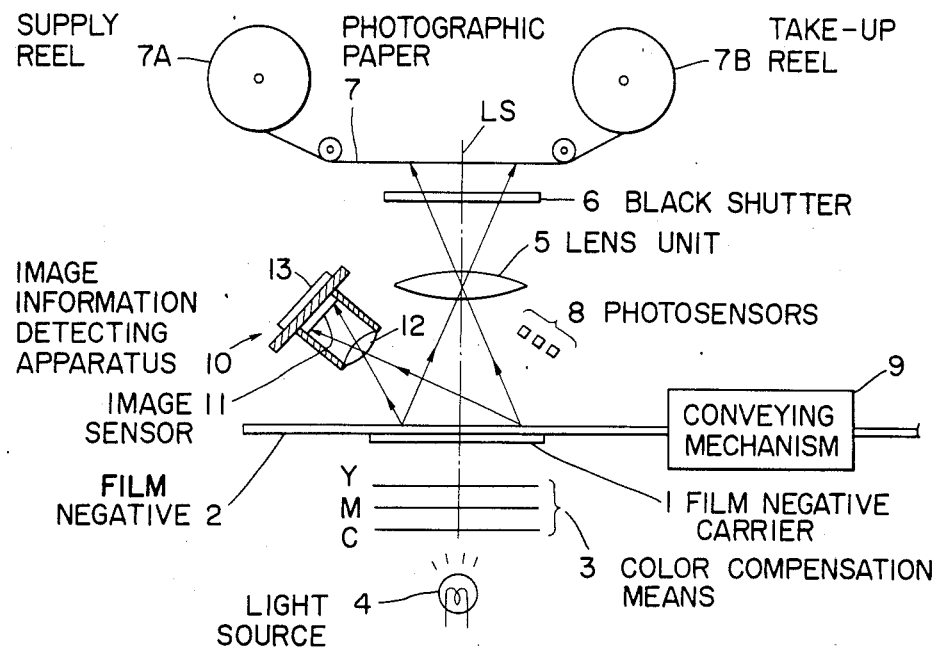
FIG. 1 is a structural view showing an embodiment of this invention applied to conventional photographic printing system without modification.

FIG. 1 is a view showing an example of the photographic image information detecting apparatus 10 according to this invention when it is applied to a conventional photographic printer without modification. A film negative 2 is conveyed by a conveying mechanism 9 to a position on a negative film carrier 1. The negative film 2 is illuminated with the light from a light source 4 via a color compensation means 3 which comprises 3-primary color filters of yellow (Y), magenta (M) and cyan (C). The light transmitted through the negative film 2 is directed to reach a photographic paper 7 via a lens unit 5 and a black shutter 6. The photographic paper 7 is wound around a supply reel 7A and reeled on a take-up reel 7B in synchronism with the movement and suspension of the film negative 2. Photosensors 8 such as photodiodes are provided near the lens unit 5 of the film 2 in order to detect image density information of the three primary colors. In accordance with the detection signals from such photosensors 8, picture printing is carried out. An image information detecting apparatus 10 comprising a two-dimensional image sensor 11 is positioned near the film negative 2 at a position inclined from an optical axis LS of the light source 4 and the film negative 2. A lens unit 12 is provided in front of the two-dimensional image sensor 11 to substantially focus the center area of the film negative 2. On the back of the image information detecting apparatus 10 is attached a substrate board 13 for mounting a processing circuit comprising integrated circuits and so on.

Figure 2:
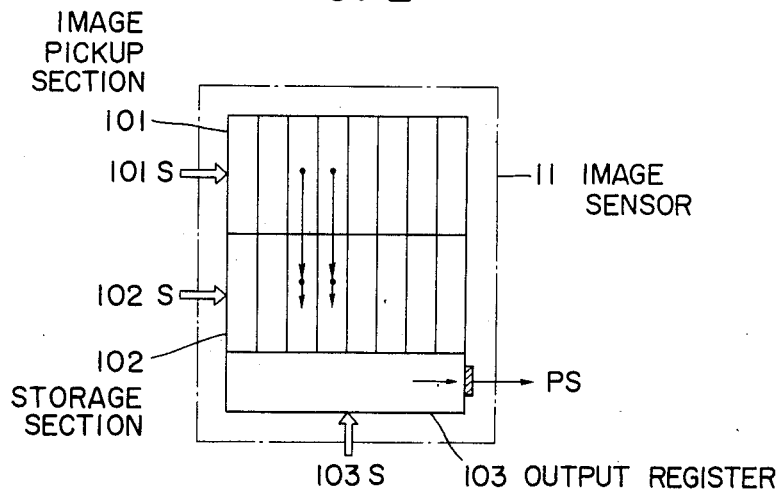
FIG. 2 is an explanatory chart to show the function of a two-dimensional image sensor to be used for this invention.

The two-dimensional image sensor 11 comprises, as shown in FIG. 2, an image pickup section 101 for optically picking up an image, a storage section 102 for storing charges transmitted from the image pickup section 101, and an output register 103 for outputting the charges stored in the storage section 102. By controlling driving signals 101S through 103S from a driving circuit, the image information in two-dimensions (area) is photoelectrically converted and outputted serially from the output register 103 in the form of an analog image signal PS. The circuit mounted on the substrate 13 has, for example, a circuit structure shown in FIG. 3. The image sensor 11 is driven by driving signals 101S through 103S supplied from the driving circuit 20. The light illuminating the image pickup section 101 of the image sensor 11 is outputted from the output register 103 as a picture sample PS, sampled and held by a sampling-and-hold circuit 21 at a predetermined sampling rate. The sample value thereof is converted by an analog-to-digital (A/D) converter 22 into digital signals DS. The digital signals DS from the A/D converter 22 are inputted into a logarithmic converter 23 for logarithmic conversion, and then converted to density signals DN, and passed through a write-in control circuit 24 and finally written in a memory 25.

A reading speed signal RS from the driving circuit 20 is inputted into the write-in control circuit 24 in order to read out image information at a predetermined speed when the image sensor 11 is driven. The write-in control circuit 24 writes in the density signals DS at predetermined positions of a memory sequentially and correspondingly with the driving speed of the image sensor 11. In other words, the reading speed of the image sensor 11 is determined by the driving speed. The reading speed in turn determines the segmentation number of picture elements with respect to an image area. The memory 25 should therefore store the detected information in correspondence with the number of picture elements, too.

When a picture is printed in a conventional manner in the above mentioned structure, the light transmitted through one frame of a film negative 2 which has been conveyed to and standing still at a printing position is detected by photosensors 8. Then, the filters in the color compensation means 3 are adjusted in response to the picture signals for each of the primary RGB colors and the black shutter 6 is opened to expose a photographic paper 7 with the thus determined exposure amount.

According to this invention, on the other hand, an image information detecting apparatus 10 comprising a two-dimensional image sensor 11 of area scanning type such as a CCD is mounted at a position near the film negative 2 at an inclined angle with respect to an optical axis to facilitate mounting operation. The whole frame of a film negative 2 is segmented into a large number of arrayed picture elements for detecting image information. In other words, when predetermined driving signals 101S through 103S are fed from the driving circuit 20 to the image sensor 11, the two-dimensional image sensor 11 is adapted to receive the light transmitted through the film negative 2 on the printing section via the lens unit 12. The two-dimensional image sensor 11 can therefore scan the whole surface of a frame of the film negative 2 along the scanning lines SL1 sequentially by segmenting the whole area into a large number of small arrayed picture elements as shown in FIG. 4A. After the whole area has been scanned, the output register 103 of the image sensor 11 outputs a picture signal PS sequentially, then the picture signal PS is sampled and held by a sample-and-hold circuit 21 and the sampled value thereof is converted by an A/D converter 22 into digital signals DS. The digital signals DS from the A/D converter 22 are logarithmically converted by a logarithmic converter 23 to density signals DN. The density signals DN are controlled by a write-in control circuit 24 to be stored in a memory in the arrays corresponding to the picture elements 21 shown in FIG. 4B and in terms of the density digital values of the negative film 2.

If the digital values for respective picture elements of the film negative 2 or the density values for respective elements in respect of three primary colors are stored in the memory 25, it is possible to read out the digital values for any particular picture element of the film negative 2 out of the memory 25. If the density values for respective three primary colors of R, G and B are stored as shown in FIG. 4B, it is possible to read out such values from the memory for processing (which will be described hereinafter) in order to determine the exposure or correction amount for photographic printing in the same manner as in the prior art.

An example of the method for discriminating the size of a film negative is described below.

Figures 5, 6A, 6B:
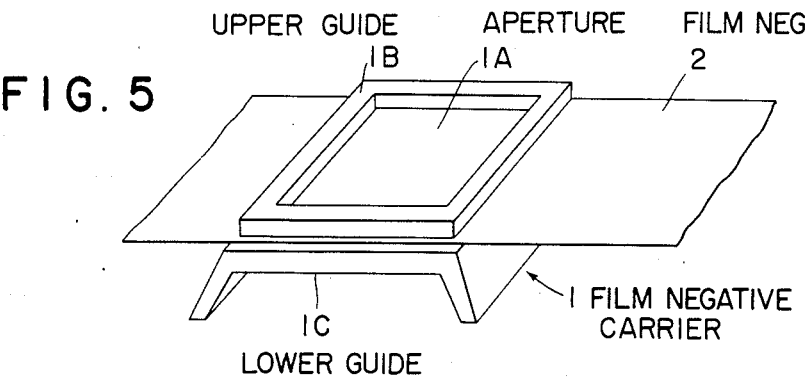
FIG. 5 is a perspective view showing the details of a printing section of the photographic printer.
FIGS. 6A and 6B are memory tables showing examples of the image information of this invention, respectively.

An elongated film negative 2 is conveyed consecutively frame by frame by a conveying mechanism 9 to a position on a film negative carrier 1. As shown in FIG. 5, a rectangular upper guide 1B having a frame aperture 1A is engaged with a lower guide 1C positioned therebelow in order to hold the film negative 2 therebetween for printing the film 2 frame by frame. The size of the aperture 1A of the upper guide 1B is identical to the size of a frame of the film negative 2 so that the peripheral portion of the frame without an image or an unexposed portion would not fall outside the area of the aperture 1A of the upper guide 1B. The area from which the two-dimensional image sensor 11 receives light is determined to correspond not only to one frame of the film negative 2 but also with a large sized film. The area includes the portion of the upper guide 1B where the light does not transmit. The image information of the area which the two-dimensional image sensor 11 detects becomes as shown in FIG. 6A in the case of a film negative carrier of 110 size while it becomes as shown in FIG. 6B in the case of the carrier of 135 size. FIGS. 6A and 6B show examples of detected image information of the unexposed portion (the developed film portion where no image is pictured) wherein the portion VA encircled by broken lines at the center defines the aperture 1A or the area of a frame. As the size of a frame corresponds to the size of a negative film 2, the size of an aperture 1A can be obtained by detecting the density "0" which means the transparent portion without image data read by the image sensor 11 and counting the area or the number of density "0" elements. This leads to a determination of the size of the negative film 2. In this case, as the optical axis of the image sensor 11 is directed toward the substantial center of the aperture 1A, the size of the negative film 2 can be determined by counting the number of picture elements having the density "0+ (or having a value close thereto) with either hardware or software and comparing the counted value with a predetermined value for each size.

As described above, the size of a negative film 2 is determined by measuring the area of the density "0" and corresponds to the number of picture elements, which indicates the size of the aperture 1A of the negative carrier 1. For example, as shown in FIG. 6A, if the number of picture elements of the density "0" is "32" (which may be 30 to 34 for allowance margin), the size is judged to be 110 size, and, as shown in FIG. 6B, if the number is "160" (or 156 to 164 for allowance margin), the size is judged to be 135 size, and if the number is "196 to 204", the size is judged to be 126 size. However, the method of size discrimination is not limited to the above method. The size information judged in the above manner is supplied to the photographic printing system so as to determine the exposure value by the selection of an applicable formula or by calculation with a formula for conducting the photographic printing process in correspondence with the particular film size.

In determining the exposure amount, the transmittance of the light of RGB color components over the whole area is controlled usually at a constant value so as to realize a print with balanced color and exposure. This is based on the empirical rule that the average reflectivity or transmittance of three colors obtained by integration of the whole scene, when a ordinary scene is pictured, is substantially constant. In other words, if a neutral object is pictured in a color film negative, the average LATD varies depending on the exposure, the quality of the light from a light source, the sensitivity of the RGB photo-sensitive layers of the color film, use of a mask, etc., but those variations can be controlled by making the print exposure for R, G and B constant at the time of printing.

The variation in density of the three colors of a color film caused by the difference of color distribution of an object, on the other hand, cannot be controlled appropriately by the above mentioned method because the variation affects the area component ratio among the three colors. In the case where the composition in luminance is quite different from ordinary distribution, e.g. the one with extremely large area of high luminances or the one with large area of low luminance, the LATD cannot be properly controlled by the method of merely controlling the print exposure with the average LATD because the variation in density on the film negative is caused by the area-wise variation of density of the object. Similarly, if the main object of a scene has the shadowed portion or extremely highlighted portion compared with respect to the surrounding objects, the density cannot be corrected as there are involved conditions extremely different from those preset in the printer. In order to solve such problems in determining print exposure, there have been proposed methods as disclosed in Japanese Patent Laid-open No. 23936/1977, No. 28131/1979 and No. 2691/1981 which segment a frame of a film negative to obtain image information from each segmented portion, and determine the exposure appropriate to the scene from all of the information obtained from respective segments. If it is assumed that the average LATD of a frame is represented by Da, the maximum density of segmented frame by Dmax and the minimum density by Dmin, the exposure $X_1$ of the 135F size film can be determined by the following equation:

$$X_1 = a_1 \cdot Da + b_1 \cdot Dmax + c_1 \cdot Dmin + D_1 \tag{1}$$

The exposure $X_2$ of a 110 size film can be determined by equation (2):

$$X_2 = a_2 \cdot Da + b_2 \cdot Dmax + c_2 \cdot Dmin + D_2 \qquad (2)$$

If a correction formula Xs like the one shown below is made available for each film size, any film negative can be printed with a proper exposure which has been properly corrected for the particular size. Coefficients Ki and Kj are determined separately by experiments for each size respectively.

$$Xs = Ki + Kj \cdot X \qquad (3)$$

When exposure is determined or corrected with the information obtained from segments of a frame, there still remains a problem as to how to segment a frame. Another problem lies in that if segmentation method should vary depending on the size of the film, the calculation process becomes complicated. In order to avoid such inconvenience, this invention enables the determination of the exposure by means of a segmentation technique common to all sizes by one-to-one correspondence between the number of segmented areas and the position thereof. More particularly, the above equations (1) and (2) are united to obtain one common formula as follows:

$$X = a \cdot Da + b \cdot Dmax + c \cdot Dmin + D \qquad (4)$$

Figure 7A:
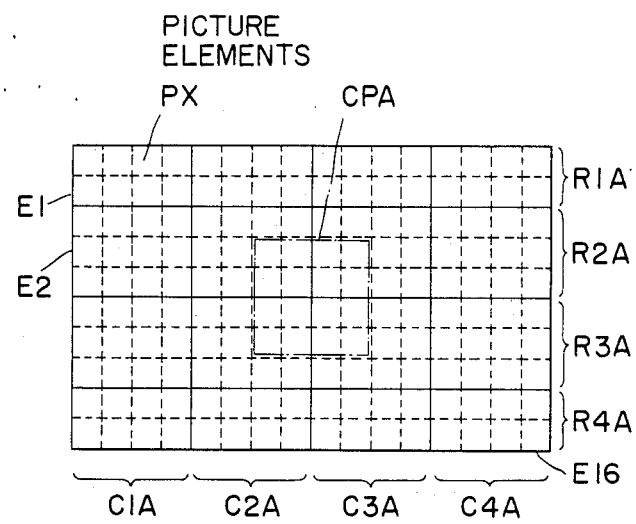
FIGS. 7A through 7E are the charts to show examples of picture element segmentation for different types of film.
Figure 7B:
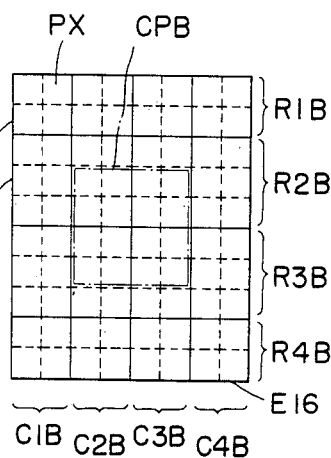
Figure 7C:
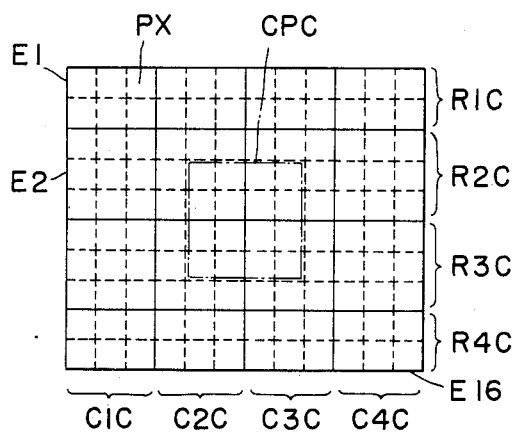
Figure 7D:
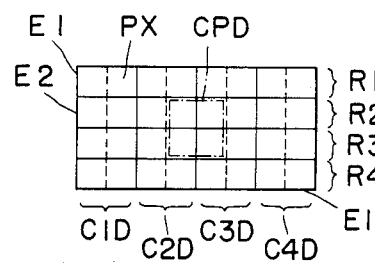
Figure 7E:
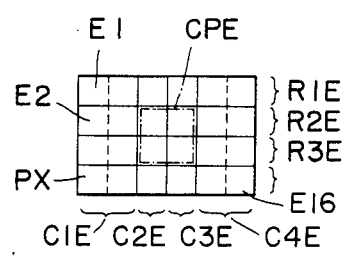

Simultaneously, as shown in FIGS. 7A through 7E, the size of the picture elements PX per se which are to be detected by the two-dimensional image sensor 10 is made constant for all the sizes: a frame of a 135F size film shown in FIG. 7A is divided into 16 groups, i.e. by four columns into elements C1A through C4A horizontally and into two-column, three-column, two-column and three-column elements R1A through R4A vertically, and the frame central data is obtained from the central area CPA comprising 16 picture elements. In a 135 size film shown in FIG. 7B, a frame is divided into 16 groups by two horizontal columns into elements C1B through C4B and into two-column, three-column, three-column and two-column elements vertically R1B through R4B and the frame central data is obtained from the central area CPB comprising 16 picture elements. In a 126 size film shown in FIG. 7C, a frame is divided into 16 groups by 3 horizontal columns to the elements C1C through C4C and two-column, three-column, three-column and two-column elements vertically R1C through R4C and the frame central data is obtained from the central area CPC comprising 16 picture elements. Similarly, a frame of 110 size is divided into 16 groups each of which comprises two horizontal columns and one vertical column (C1D through C4D horizontally and R1D through R4D vertically) and the central area CPD comprises four picture elements. The disk size film of FIG. 7E is divided into 16 groups by segmenting a frame into two-column, one-column, one-column and two-column elements horizontally C1E through C4E and by one vertical column R1E through R4E and the central area CPE comprises four picture elements. In this manner, all the frames of respective film sizes are divided into 16 groups E1 through E16 of segments and all the central areas CPA through CPE are defined to include the center of the frame to obtain image information. It is therefore not necessary to change the reading-out area of the image sensor for various film sizes. With only one common equation, a frame can be processed for any film size. One segment area may comprise plural elements; however, it is possible to obtain image information of each segmented area simply by calculating a mean value of each element data. As the frames of respective film sizes comprise area groups E1 through E16 and the central areas CPi (i=A through E), and as the average information of respective area groups E1 through E16 and CPi can be easily calculated from the data of component elements, the exposure can be obtained by using the above formula (4) and the obtained exposure can be corrected properly by the above formula (3), even if the size of each film negative conveyed to the printing section varies.

Although a frame herein is segmented into 16 groups for each size, it may be divided into any arbitrary number (for instance, 20 or 30). The correspondence between respective film size and the number of segment groups can be arbitrarily selected. The method of obtaining image information of respectively divided groups out of image data may be the method of storing all of the image data in a memory once and then reading it out or the method of processing the data with the size information obtained in advance by detecting the picture element data.

Although the image information detecting apparatus 10 is arranged at an inclination with respect to the optical axis of the film negative 2 and the light source 4 for facilitating being mounted in the above embodiment, the light transmitted through a film negative 2 may be reflected by a beam spritter arranged in front of a lens unit 5 and the reflected light may be guided to the detecting apparatus 10. In such a case, the transmitted light from the beam splitter is illuminated on a photographic paper 7 via the lens unit 5. The lens unit 5 and the detecting apparatus 10 may be made movable mechanically with respect to the optical axis LS so that when a film negative 2 is exposed on the photographic paper 7, the lens unit 5 is made so as to be aligned with the optical axis LS while the image information of the film 2 is detected and the image information detecting apparatus 10 is made so as to be aligned with the optical axis LS. Although the image information is detected by the detecting apparatus 10 out of the light transmitted through the film negative 2 in the above embodiment, it may be detected from the light reflected from the film negative 2.

The number of component elements of an image sensor may be selected arbitrarily. Depending upon the size of an original film such as a negative film, the magnification of the lens unit or the necessary number of picture elements of a frame, the number of component elements of the image sensor may be selected arbitrarily.

The image information detecting apparatus 10 is provided at an inclination with respect to the optical axis LS of the negative film 2 and the light source 4 in the above embodiment. If the area on the two-dimensional image sensor 11 is large, the focused image becomes distorted and therefore a correct image information cannot be precisely detected. If everything goes properly, "0" information should be obtained from the image sensor 11 in a rectangular form arrayed as shown in FIG. 6B; however, as the focused image is distorted, the difference occurs perspectively as shown by the broken lines in FIG. 8. If such a distorted image is focused, a discrepancy occurs between the actual picture image and the detected information from the image sensor 11, thereby obviating the detection of accurate image information.

Figures 8, 9:
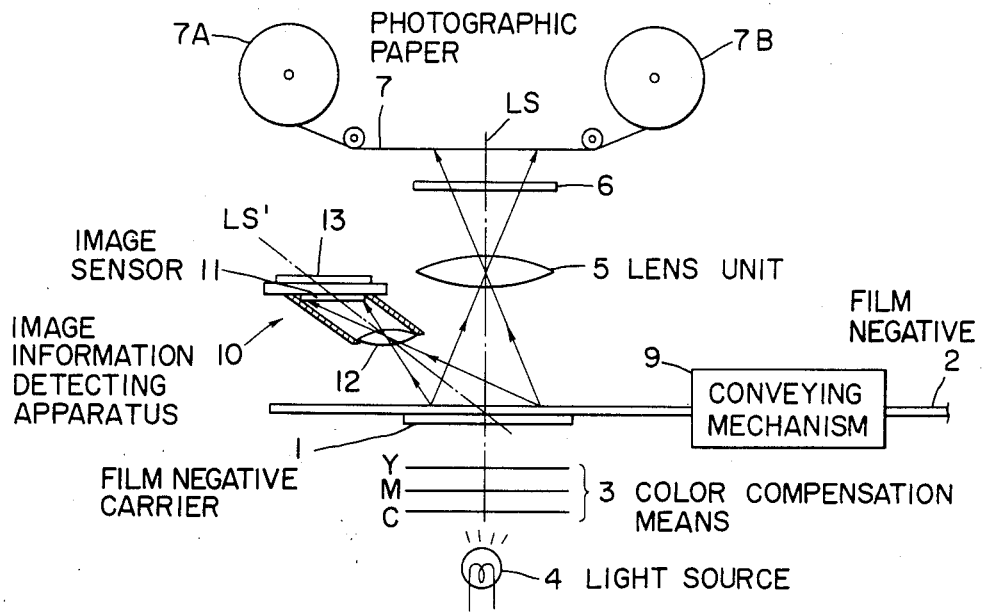
FIG. 8 is a chart used to explain the distortion caused in a detected image.
FIG. 9 is a structural view showing another embodiment of the image information detecting apparatus according to this invention.
Figure 10:
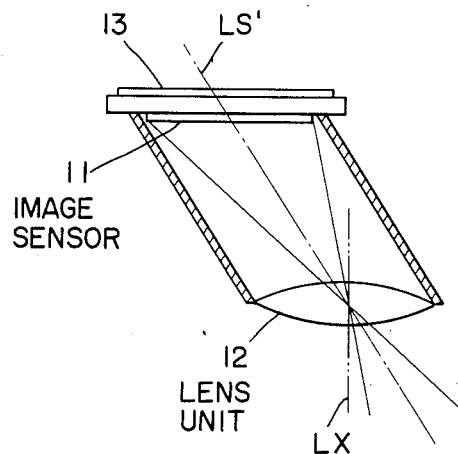
FIG. 10 is an enlarged view of the two-dimensional image sensor thereof.

In order to avoid such problems, the image information detecting apparatus should have the structure shown in FIGS. 9 and 10. A two-dimensional image sensor 11 is arranged in parallel to the surface of a film negative 2 in an image information detecting apparatus 10 in a manner so as not to block the light pass extending from the film negative 2 to the lens unit 5. The optical axis LS' connecting the two-dimensional image sensor 11 with the negative film 2 is inclined from the axis LS. A lens unit 12 for substantially focusing central portion of the film negative 2 is arranged on the optical axis LS' of the two-dimensional image sensor 11 in such a manner that the optical axis LX of the original lens is perpendicular to the light receiving surface of the image sensor 11.

Since the light receiving surface of the two-dimensional image sensor 11 becomes parallel to the film negative 2 in such a structure, an accurate image without distortion can be focused on the image sensor 11. Therefore, a negative image focused on the image sensor 11 will not be distorted as shown in FIG. 8 and the detection can be performed even against a large area as shown in FIG. 6B. This technique is a modification of a camera adjustment technique generally used in photography. In order to simplify the structure of the printer mechanism, the optical axis LX of the lens for the two-dimensional image sensor 11 is deliberately arranged so as to perpendicularly cross the center of a frame and yet to enable precise image information detection. The types of applicable photographic technique are "shifting" which displaces in parallel the base plate of a lens or the surface of a picture frame, "tilting" which tilts the base plate of a lens or the frame either upward or downward, "swing" and "rising front".

Figure 11:
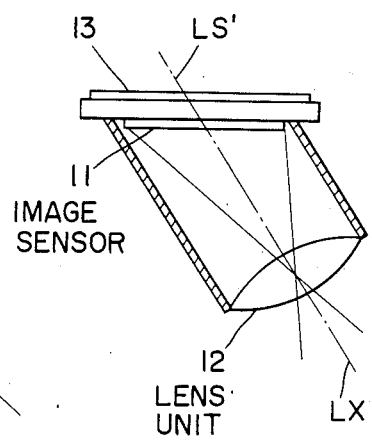
FIG. 11 is a view showing a modified structure of the image sensor shown in FIG. 10.

Although in the above embodiment the optical axis LX of the lens unit 12 is arranged perpendicular to the light receiving surface of the two-dimensional image sensor 11, it may be arranged in alignment with the optical axis LS' of a lens unit 12 as shown in FIG. 11. If the optical axis LX of the lens unit 12 is arranged perpendicular to the light receiving surface of the image sensor 11 as shown in the embodiment of FIG. 10, the whole surface of the image sensor 11 can precisely focus, but since the lens unit 12 has to be adjusted in position, it needs a lens having a large image circle. If the optical axes LX and LS' are aligned as shown in FIG. 11, on the other hand, even a lens having a narrow image circle can be used although the depth of focus should be increased for focusing the whole area of the image sensor 11.

Needless to say, the above described detection is applicable to storage-type light receiving elements of a line sensor. The detection with a line sensor is described below.

Figure 12:
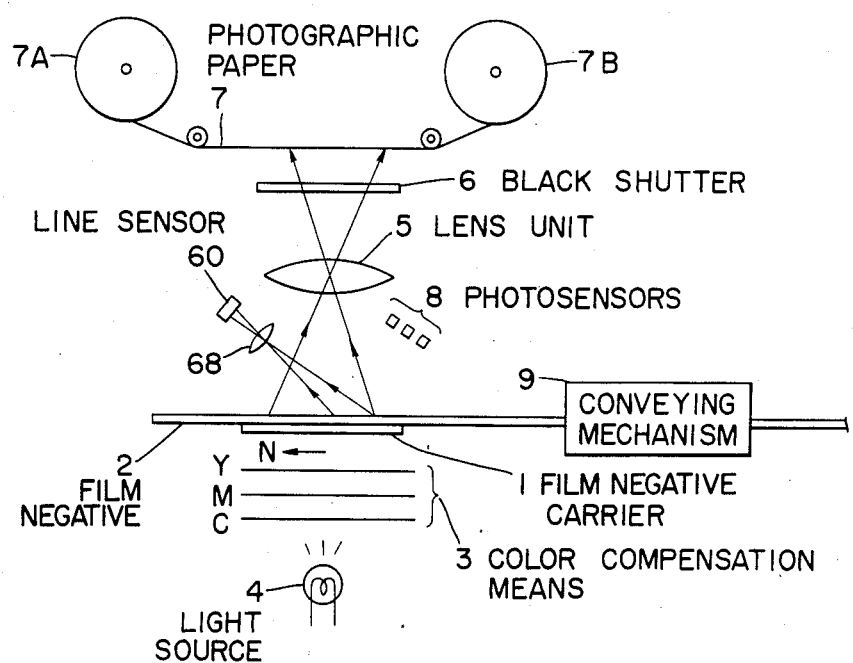
FIG. 12 is a structural view showing still another embodiment of this invention.
Figure 13:
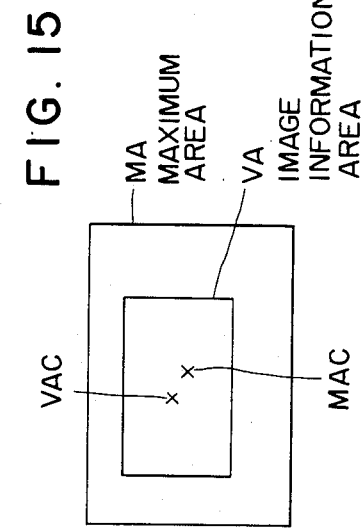
FIG. 13 is a view used to explain the positional relationship between the line sensor and a film negative.

FIG. 12 shows an embodiment of a photographic printer using a line sensor 60. A film negative 2 placed on a film negative carrier 1 is conveyed, for instance, in the direction N by the conveying mechanism 9. While being conveyed, a line sensor 60 detects the image information of the film negative 2 via a lens unit 68. Except for this feature, the embodiment is identical with the one shown in FIG. 1. The positional relationship between the line sensor 60 and the movement of the film 2 is shown in FIG. 13. The line sensor 60 is arranged at a position perpendicular to the conveying direction N of the film negative 2 and in parallel to the surface thereof. The scanning of a frame is determined by the relationship between the scanning line SL2 and the conveying direction N of the film negative 2 shown in FIG. 4A, and the image information of one frame can therefore be taken out as one frame of the film negative 2 is conveyed.

Figure 14:
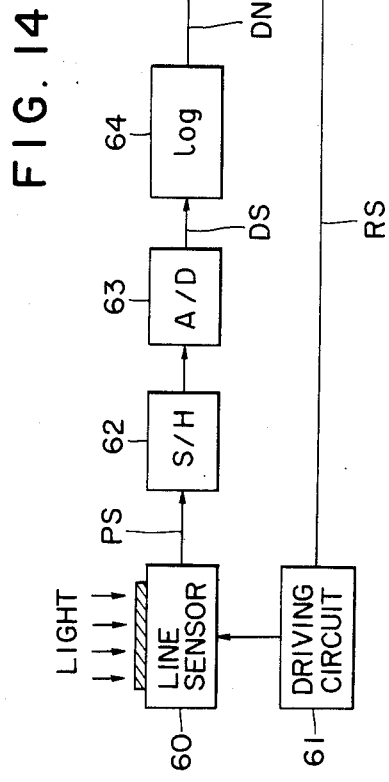
FIG. 14 is a block diagram showing the control system thereof.

FIG. 14 is a block diagram showing the control system of a line sensor 60. The line sensor 60 is driven by a driving circuit 61, and the picture signal PS read out and photoelectrically converted by the line sensor 60 is inputted into a sample-and-hold circuit 62 and sampled at a predetermined speed. The sampled value is converted into digital signals DS by an A/D converter 63. The digital signals DS from the A/D converter 63 are inputted into a logarithmic converter 64, converted into density signals DN and then written in a memory 66 via write-in control circuit 65. In this case, the write-in control circuit 65 receives a reading-out speed signal RS outputted in correspondence with the driving speed of the driving circuit 61 and a speed signal TS from a speed detector 67 connected to a conveying mechanism 7 which conveys the negative film 2. The write-in control circuit reads the picture image information for each line in correspondence with the reading speed of the line sensor 60 and the conveying speed of the film negative 2, whereby the memory 66 can store density value data for respective segmented elements which are arranged in plural arrays similar to the one shown in FIG. 4B.

When the image information of a film negative 2 is detected by a line sensor 60 with the aforementioned structure, the negative film 2 is carried by a conveying mechanism 9 in the direction N at a predetermined speed. The conveying speed is detected by a speed detector 67 and the speed signal TS is inputted into a write-in control circit 65. When the film negative 2 is carried in the direction N, the light which is transmitted through the negative film 2 is inputted into the line sensor 60. The line sensor 60 is then driven by a driving circuit 61 with a driving signal to output a picture signal PS which is photoelectrically converted in accordance with the amount of light received. Since the reading speed of the line sensor 60 corresponds to the pulse frequency of the driving signal from the driving circuit 61, if the line sensor 60 is driven at a speed relatively higher than the conveying speed of the negative film 2, then the negative film 2 can consecutively be segmented into plural and arrayed picture elements 21 by scanning line SL2 which is perpendicular to the direction N as shown in FIG. 4A. The picture signal PS from the line sensor 60 for each scanning line SL2 is inputted into the sample-and-hold circuit 62 and the sampled value is converted into digital signals DS by the A/D converter 63. The digital signals DS are converted into density signals DN by the logarithmic converter 64 and written in the memory 66 via a write-in control circuit 65. Since the reading speed signal RS is inputted into the write-in control circuit 65 from the driving circuit 61 to determine the relationship between the reading out and the writing-in, the density signals DN from the logarithmic converter 64 consecutively cause the density data to be written-in at the position corresponding to the segmentation of the film negative 2 as shown in FIG. 4B. By repeating the detection of picture image information for each scanning line SL2 by the line sensor 60 and the writing-in of the density data in the memory 66 over the whole surface of the film negative 2, the density signals DN are stored in the memory 66 in the arrays corresponding to the segmented picture elements 21 of the picture frame.

Although the line sensor 60 is fixed and the film negative 2 is conveyed at a predetermined speed to the line sensor 60 for detecting the image information over the whole surface of the film in the above embodiment, it is possible to have the film negative 2 be fixed and the line sensor 60 be moved across the entire surface of the film negative 2 to achieve the same effect. In this case, if the line sensor 60 is moved in the direction parallel to the film negative 2, it can detect with a high precision.

Figure 15:
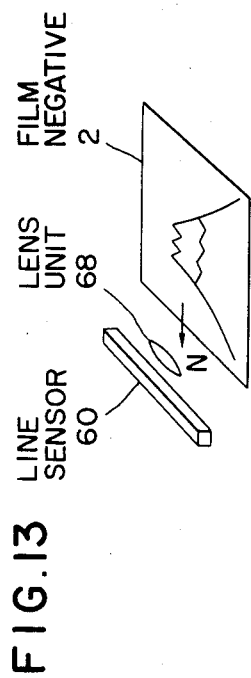
FIG. 15 is a view showing the misalignment between the center of the maximum area and the center of the image information area of a two-dimensional image sensor.

Although in the embodiment shown in FIGS. 6A and 6B, the center MAC of the maximum area MA of the two-dimensional image sensor 11 coincides with the size of the frame aperture 1A of the film negative carrier 1 or the center VAC of the image information area VA, the centers MAC and VAC generally do not coincide with each other but deviate with an allowable mechanical precision in practice as shown in FIG. 15. The mounting position of the image information detecting apparatus 10 should therefore be finely adjusted so as to align the center MAC of the maximum area MA with the center VAC of the information area VA. According to this invention as shown in FIGS. 6A and 6B, however, the position of the image information area VA can be determined based on the image information, and the information of this position or the image information of the actual information area VA can be detected without a need for aligning the center MAC of the maximum area MA with the center VAC of the image information area VA, thereby eliminating the trouble of finely adjusting the mounting position of the image information detecting apparatus 10.

Figure 16:
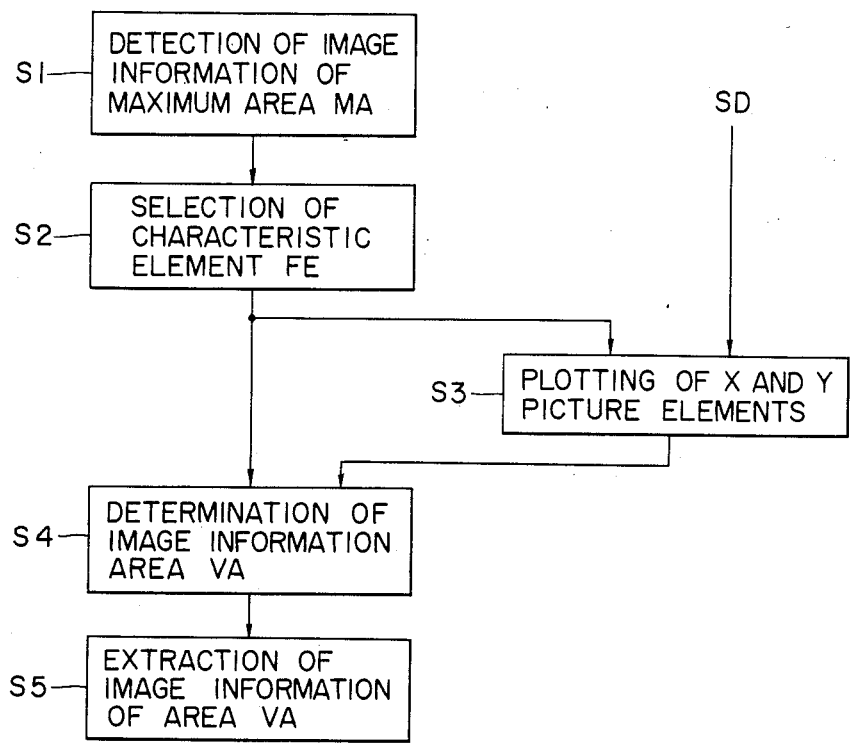
FIG. 16 is a flow chart used to show an example of the image information detecting method according to this invention.
Figure 17:
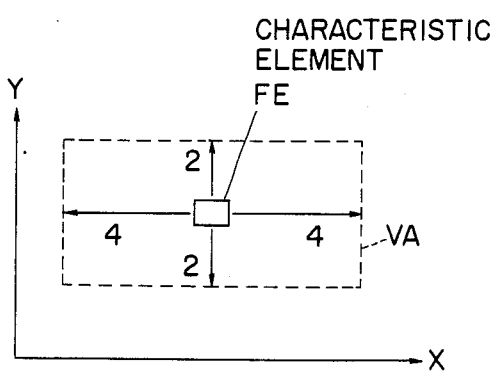
FIG. 17 is a view used to explain how to allocate picture elements from the center of the unexposed portion.

FIG. 16 is the flow chart showing the position adjusting method mentioned above. First of all, the image information of the portion having no image on the film negative 2 as shown in FIGS. 6A and 6B or in the case where no film negative 2 is mounted is detected over the maximum area of the two-dimensional image sensor 11 (Step S1). Then, out of the image information of the portion without an image or the portion of the density "0" (or the value close thereto) of each element is selected a characteristic element FE like the one shown in FIG. 17. For instance, an apex of a square or the central area of the density "0" is a characteristic element FE (Step S2). Based on the characteristic element FE and the size discrimination information SD which is obtained in the above manner or otherwise, picture elements are plotted from the reference characteristic element FE within the maximum area MA in the directions of X-axis and Y-axis (Step S3). For example, assuming that the characteristic element FE is the center of the portion having no image as shown in FIG. 17, the size of the original film is judged as 135 size by the size discrimination information SD, and 135 size has the area equivalent to 9 elements in the X-axis direction and 5 picture elements in the Y-axis direction. If four picture elements each in positive and negative directions of the X-axis and two picture elements each in positive and negative directions of the Y-axis are allocated from the center of the characteristic element FE or the center of the portion having no image as shown in FIG. 17, an image information area VA of the size determined by the size discrimination information SD can be set as shown with broken line in FIG. 17 (Step S4). When the two-dimensional image sensor 11 detects the image information by scanning all of the surface of the maximum area MA, the detected data would suffice for the image processing thereafter if the detection only extracts the image information of the image information area VA along (Step S5). In other words, the image processing can be completed simply by detecting the area corresponding to the image size. This enhances the speed in processing as well as simplifies the processing as the method does not need the position adjusting of the image information detecting apparatus 10 in mounting.

Figure 18:
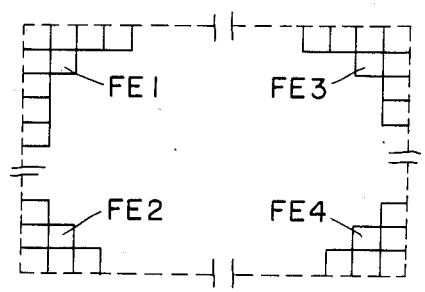
FIG. 18 is a chart used to show an example of the method to select a characteristic picture element close to the apex of the unexposed portion.

Although the portion having no image is used as a characteristic element FE in the above description, the element FE may be one of the apexes of the square. In that case, any one of the elements FE1 through FE4 shown in FIG. 18 or the second element from an apex on the diagonal lines is used as the reference and an image information area VA is plotted in accordance with the size discrimination information SD in the manner similar to the above. The size discrimination information SD may be fed by an operator who judges the size visually by the area or the number of picture elements of the portion having no image.

As described in the foregoing, according to this invention, image information of an original picture film as well as peripheral area can be detected by an image sensor and the image information of the original film is detected over the whole frame which is segmented into plural picture elements. Arbitrary image data can therefore be grouped as several information segments to which segmentation of a frame can be corresponded position-wise even if the film size varies. A common method for determining sxposure and correction amount may be used for different sizes.

Since the size of an original picture film is automatically determined from the density values of a large number of segmented elements in this invention, the size can be determined quickly and accurately. Since the size discrimination data is obtained automatically by electrical signals, the exposure needed for printing can be determined automatically. Furthermore, since the image information area corresponding to the size discrimination data can be automatically set according to this invention method, fine adjusting works which have been heretofore required become unnecessary.

It should be understood that many modifications and adaptations of the invention will become apparent to those skilled in the art and it is intended to encompass such obvious modifications and changes in the scope of the claims appended hereto.

What is claimed is:

1. A method for determining the size of an original picture film wherein light transmitted from a light source though said original film is received by an image sensor, and image information over an entire area from which said image sensor receives light is detected from respective picture elements which are divided into a plurality of segments and values which are detected by said image sensor are compared with predetermined values which correspond to respective film sizes in order to determine the size of said original picture film.

2. A method for determining the size of an original picture film as claimed in claim 1, wherein said detected values and predetermined values are density values.

3. A method for determining the size of an original picture film as claimed in claim 1, wherein said original picture film is an unexposed film.

4. A method for determining the size of an original picture film as claimed in claim 1, wherein said image sensor is mounted so as to receive light transmitted through a frame aperture of a film negative carrier which is in turn mounted on a photographic printing section of a photographic printer.

5. A method for determining the size of an original picture film as claimed in claim 1, wherein said image sensor is an area sensor and is positioned so as to be inclined from an optical axis between said original picture film and said light source to detect image information.

6. A method for determining the size of an original picture film as claimed in claim 5, wherein a surface of said area sensor is parallel to a surface said original film.

7. A method for determining the size of an original picture film as claimed in claim 1, wherein said image sensor is a fixed line sensor and said original picture film is conveyed to a position for detecting the image information.

8. A method for determining the size of an original picture film as claimed in claim 1, wherein said image sensor is a movable line sensor and is moved toward said original film which is kept still for detecting the image information.

9. A method for determining the size of an original picture film as claimed in claim 8, wherein said line sensor is moved in a direction which is parallel to a surface said original picture film.

10. A photographic image information detecting method wherein light transmitted through an original picture film is received by an image sensor, and image information over an entire frame area from which said image sensor receives light is detected from respective picture elements which are divided into a plurality of segments, the size of said original picture film is determined, the image information for respective picture elements is arranged in accordance with an exposure determination area which is preset for respective film sizes with the size discrimination information and the result is added to an exposure determination formula to determine the final exposure for said original picture film.

11. A photographic image information detecting method as claimed in claim 10, wherein said exposure determination formula is one formula which is common to all film sizes of said picture film.

12. A photographic image information detection method as claimed in claim 10, wherein when said exposure determination area comprises plural elements, mean values of data corresponding to said exposure determination area form element data and are used for calculation.

13. A photographic image information detecting method as claimed in claim 10, wherein image information of each of said element data is sought for the three primary colors of red, green and blue.

14. A photographic image information detecting method wherein light transmitted through an original picture film is received by an image sensor, image information corresponding to light received over an entire surface of said image sensor is detected for respective picture elements which are divided into a plurality of segments, a characteristic element which corresponds to a feature of said image information is selected out of said picture elements and said picture elements are plotted using said characteristic element as a reference position in accordance with a size determination data of said original picture film, and an image information area is automatically set in accordance with said plotted data and characteristic element.

15. A photographic image information detecting method as claimed in claim 14, wherein said characteristic element is a center picture element corresponding to a portion of said original picture film having no image.

16. A photographic image information detecting method as claimed in claim 14, wherein said characteristic element is an apex of a square portion of said original picture film having no image.

17. An image information detecting apparatus wherein light transmitted from a light source through an original picture film is received by an image sensor, image information over an entire area from which said image sensor receives light is detected from respective picture elements which are divided into a plurality of segments, wherein when said image sensor is arranged at a position inclined away from an optical axis between said original picture film and said light source, distortion of a detected image caused by photometrically measuring said original picture film with said image sensor which is inclined from said optical axis is compensated for and corrected by disposing a light receiving surface of said image sensor so as to be parallel to a surface of said original picture film.

18. A image information detecting apparatus as claimed in claim 17, wherein a lens unit is provided in front of said image sensor.

19. A image information detecting apparatus as claimed in claim 18, wherein an optical axis of said lens unit perpendicularly crosses said image sensor surface.

20. A image information detecting apparatus as claimed in claim 18, wherein an optical axis of said lens unit is identical with an optical axis of said image sensor which is inclined with respect to said optical axis between said original picture film and said light source.

21. A image information detecting apparatus as claimed in claim 17, wherein said image sensor is an area sensor.

22. A image information detecting method as claimed in claim 17, wherein said image sensor is a line sensor.

23. A image information detecting apparatus as claimed in claim 22, wherein said line sensor is fixed and said original film is conveyed to a position for detecting image information.

24. A image information detecting apparatus as claimed in claim 22, wherein said line sensor is movable and is moved toward said original film which is kept still for detecting image information.

25. A photographic image information detecting method wherein light transmitted from an original picture film is received by an image sensor, image information over an entire frame area from which said image sensor receives light is detected from respective picture elements which are divided into a plurality of segments, the size of said original picture film is determined, the image information for respective picture elements is utilized according to an exposure determination area which is preset for respective film sizes with size determination information and the result is used in connection with an exposure determination formula so as to determine the final exposure for said original picture film.

* * * * *